Figure 1:
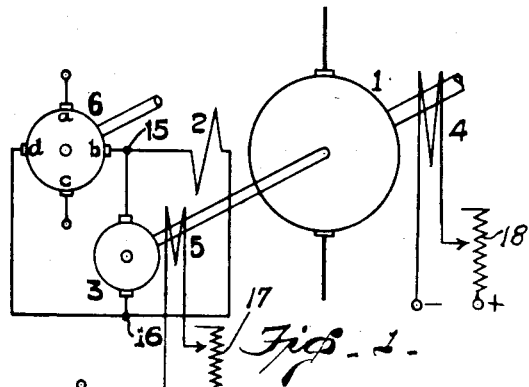

Nov. 23, 1937.  J. M. PESTARINI  2,100,171
ELECTRICAL MACHINE INSERTED IN A SERIES NETWORK
AND OPERATING AT AN ADJUSTABLE CONSTANT SPEED
Filed Oct. 14, 1935

Inventor
Joseph Maximus Pestarini
By Norris + Bateman
Attorneys

Patented Nov. 23, 1937

2,100,171

UNITED STATES PATENT OFFICE 2,100,171

ELECTRICAL MACHINE INSERTED IN A SERIES NETWORK AND OPERATING AT AN ADJUSTABLE CONSTANT SPEED

Joseph Maximus Pestarini, Grant City, Staten Island, N. Y.

Application October 14, 1935, Serial No. 44,990
In France January 22, 1934

6 Claims. (Cl. 172—239)

This invention relates to rotating electrical machines which are connected in series with one another and which are supplied from a source which delivers a current of substantially constant strength. The complete chain of all these machines forms a series network.

The current that traverses the armatures of these machines is thus of a substantially constant strength, and the source supplying the energy will supply such a voltage in one direction or the other, as required by the consumers, which may operate as motors or as generators. The arrangement into a series network has many advantages such as for example very simple switch-gear, elimination of the danger due to short-circuit, easy transition from motoring to regenerating and vice versa; easy operation at a high speed and at very low speed as well, easy reversal of the direction of rotation, and stalling of the motors without trouble.

However, this arrangement is not directly suitable for supplying motors which must rotate at a practically constant speed even when the resistant torque varies from its full accelerating value to zero and further to its full braking value. Let us call $N_o$ the no load speed, that is, the speed for which the motor must develop no torque; then when the torque reaches its full accelerating value, the speed of the motor must be very slightly below $N_o$, say 3% less; when the torque has its full braking value the speed of the motor must be slightly above $N_o$, say 3% more. In this case the motor may be said to have a practically constant speed. Further, there are applications, as in paper machine driving motors, where the above mentioned no load speed $N_o$ must be adjusted at different values according to the special kind of paper to be manufactured, also there are cases where the required practically constant speed must be adjusted at different values, one value for each case. The present invention discloses arrangements providing motors inserted in a series network, capable of operating at a practically constant speed, the transition from full accelerating torque to full braking torque involving but a very small discrepancy in speed, say 3% of the value of the no load speed $N_o$.

Further the present invention discloses means for controlling the value of the above mentioned no load $N_o$. The present application is a continuation in part of applicant's copending application Ser. No. 759,662 filed December 29, 1934.

The invention consists essentially in supplying the field of the motor which must operate at a constant speed, with a current which varies automatically and quickly in such a way as to maintain the motor torque at the right value when the load torque varies, the motor torque varying very much for a slight discrepancy from the desired speed.

According to the present invention the field winding of the main motor is connected in series relation with a source of electromotive force which is caused to vary rapidly with the speed of the main motor and those two elements constitute a closed electrical circuit which by two points is inserted into an auxiliary electrical circuit supplied also with direct constant current.

Figure 2:
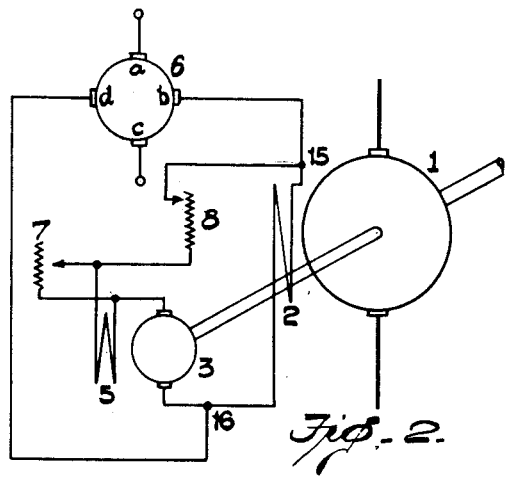
Figure 3:
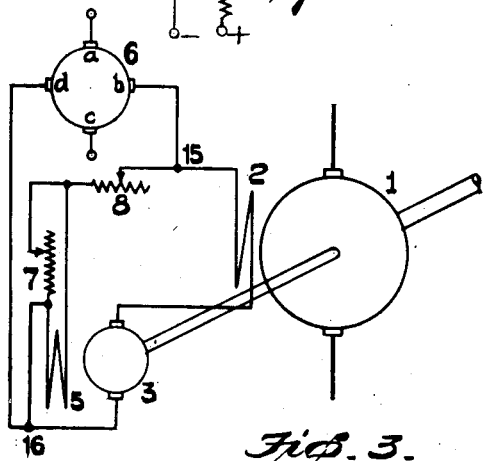
Figure 4:
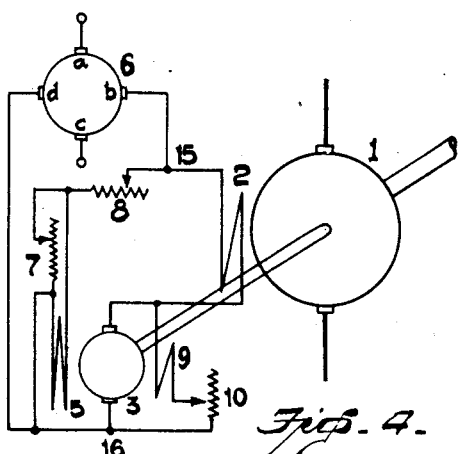
Figure 5:
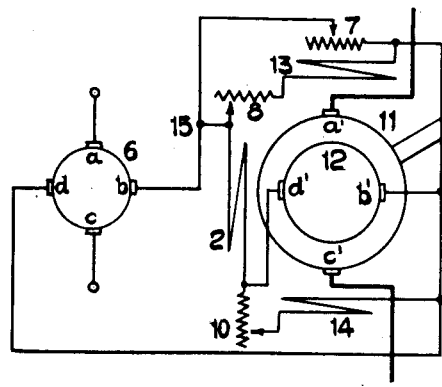
Figure 6:
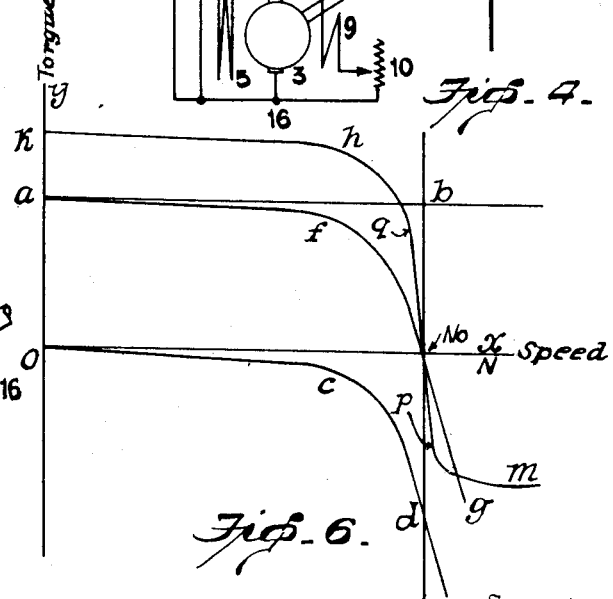

Figs. 1, 2, and 3 give three alternative schemes embodying this invention differing from one another only by the choice of the two points of the closed circuit constituted by the field winding of the main motor and the auxiliary source of electromotive source varying with the speed;

Fig. 4 is an alternative of Fig. 3 with a complementary winding on the auxiliary source used for a more accurate control of the value of the no load speed $N_o$;

Fig. 5 gives a scheme embodying the present invention where the auxiliary source of electromotive force varying with the speed is obtained by a separate rotor winding from the main motor itself; and Fig. 6 is a diagram illustrating the operation of the proposed arrangement.

In Fig. 1 the main motor is represented by 1 and is supposed to be inserted by its two brushes into a circuit supplied with direct constant current by some suitable means, not represented on the figure.

The main motor 1 in this figure is represented as having two field windings 2 and 4; the field winding 4 is supposed to create a constant value of ampere-turns; the field winding 2 is connected in series relation with an auxiliary source of electromotive force varying with the speed of the main motor 1 and represented on this figure by a small dynamo 3 driven by the main motor 1. The closed circuit constituted by the field winding 2 and the dynamo 3 is inserted at two points 15 and 16 into an auxiliary electrical circuit supplied also with direct constant current by some adequate generator, shown in Fig. 1 as a metadyne 6.

The metadyne is an electrical rotating machine mentioned in many previous American patents, for instance in Patents Nos. 1,945,447 and 1,962,030, it consisting essentially of a rotor with winding and commutator as in a dynamo machine, and a stator which mainly affords a return path of low magnetic reluctance for the fluxes which are set up by the rotor currents, but which also may carry some windings which will endow the machine with desired characteristics. Generally, the commutator carries two sets of brushes, and the current traversing one set of brushes creates, by its rotor ampere-turns, a flux which induces an electromotive force between the brushes of the other set. One set of brushes, called the primary set and traversed by a current called the primary current, has its brushes kept at an essentially constant difference of potential, while the other set of brushes, called the secondary set, are traversed by a current called the secondary current and supply their current to the consumers, either machines or field windings.

A description in detail of the metadyne principles is given in a paper entitled "Esquisse sur la Metadyne" by J. M. Pestarini in the "Bulletin Scientifique A. I. M." No. 4, April 1931 of "l'Association des Ingenieurs Electriciens" published by the "Institut Electrotechnique Montefiore", Liege, Belgium.

The operation of the arrangement shown on Fig. 1 is as follows:

When the motor 1 is at rest, practically all the current of constant value supplied by the metadyne 6 traverses the small auxiliary dynamo 3, so that the ampere-turns created by the field winding 2 are then practically zero, thus the field of the main motor 1 is then energized by the ampere-turns of constant value, created by the field winding 4. As the armature of the motor 1 is fed by direct constant current, it will start and its speed will increase, but then the auxiliary dynamo 3, conveniently excited by its field winding 5, will induce an electromotive force varying with the speed and obliges the auxiliary current supplied by the metadyne 6 to traverse less and less the armature of the dynamo 3 and more and more the field winding 2, but the field winding 2 is arranged to create ampere-turns in the reverse sense to the ampere-turns of the field winding 4, therefore the total resulting ampere-turns of the field windings 2 and 4 will be come reduced with the speed to a given value, let it be $N_0$, at which the ampere-turns of the two field windings 2 and 4 balance one another. For this speed, no flux will be created in the main motor 1, and therefore the latter will develop no torque.

The diagram of Fig. 6 shows the change of ampere-turns and of the torque as a function of the speed N of the motor. The straight line $ab$ represents the constant ampere-turns created by the winding 4 supposed to be separately excited; the line $ocd$ represents the ampere-turns created by the field winding 2. The resultant ampere-turns of the said two field windings are then represented by line $afg$ the ordinates of which are equal to the algebraic sum of the ordinates of the two previous lines. The line $afg$ cuts the axis of the abscissae at the point $N_0$, the abscissa of which is the no load speed. If the iron of the motor were saturated, then the ordinate of the line $afN_0g$ could represent also the torque, as the flux would be proportional to the resultant ampere-turns and the torque is proportional to the flux and the armature current which is supposed to be constant. But if the iron is saturated, this being the general case, then the torque will be represented by the ordinates of the line $khN_0m$ which is bent more sharply than the line $afN_0g$. An ultimate very quick torque variation for a slight speed variation is thus obtained at the neighborhood of the no load speed $N_0$. The ordinate $ok$ is the maximum motor torque available. This diagram shows the particular advantage of the motor which is the object of the present patent application: so far as the resistant torque is within its normal limits, the speed will remain practically constant and the point representing the operation on diagram of Fig. 6 will oscillate along the straight portion $qN_0p$ of the characteristic, should the resistant torque, for some accidental reason, exceedingly increase above its normal value, then the motor will stall without any trouble either in the mechanical or in electrical part of the plant and neither a mechanical breakage nor overcurrents, switch tripping or energy losses shall occur. The tangent of the line $khN_0m$ at the point $N_0$ gives the accuracy with which the speed is kept practically constant. The nearer this tangent is to the vertical line $bnd$, the greater is the accuracy. The sharper will be the bending of the characteristic $khqN_0pm$, the nearer will be the above mentioned tangent at $N_0$ to the vertical $bN_0d$. This is obtained by decreasing the armature resistance of the dynamo 3 as much as possible. Practically speed discrepancies at full load from no load of about 3% have been easily obtained by making the dynamo 3 one fifth the size of the motor.

When it is desired to change the value of the no load speed $N_0$, the following means may be adopted separately or simultaneously: variation in value of the ampere turns created by the field winding 5 by resistor 17, variation in value of the field winding 4 by resistor 18, variation in value of the constant current supplied by the auxiliary metadyne 6 and other similar control means well known to those skilled in the art.

In Fig. 2 the main motor 1 is again represented driving a small auxiliary dynamo 3, the source of E. M. F. varying with the speed. The field winding 2 of the main motor is connected in series relation with the auxiliary source 3 and the so constituted closed circuit is fed at its two points 15 and 16 by an auxiliary source of direct current of constant intensity, represented in this figure by the metadyne 6.

The scheme of Fig. 2 differs from that of Fig. 1 in the elimination of the winding 4 of Fig. 1 and in the arrangement of the controlling means: the field winding 5 of the auxiliary dynamo 3 is connected in series with its dynamo and is controlled by a resistor 7 shunting the said field winding. The resistor 8 also allows for a further more accurate regulation. The operation is as follows:

When the main motor 1 is at rest the auxiliary dynamo 3 develops no electromotive force. The constant current supplied by the metadyne 6 is divided into two parts when entering the closed circuit constituted by the field winding 2 and the auxiliary dynamo machine 3. The largest part of the said auxiliary constant current traverses the field winding 2 and only a small part, limited also by the resistor 8, traverses the auxiliary dynamo 3; therefore, the main motor 1 develops a strong torque and starts accelerating; when the speed increases the electromotive force developed by the auxiliary dynamo 3 increases and it is arranged to have the same direction as the current traversing the auxiliary dynamo machine.

when it was at rest. Therefore, the current traversing the field winding 2 decreases with the speed and at a given value of the speed $N_o$ the field winding 2 is traversed by no current, and then the torque developed by the main motor is nil and the speed $N_o$ is the no load speed. The diagram of Fig. 6 applies here as well as for Fig. 1, and the same phenomena occur.

The scheme represented in Fig. 3 differs from the precedent scheme only with respect to the location of the two points 15 and 16 through which the closed circuit comprising the field winding 2 of the main motor 1 and the auxiliary dynamo 3, is inserted in the auxiliary circuit supplied with constant current by the metadyne 6, and the operation is very similar in both of the schemes shown in Fig. 2 and Fig. 3.

The control of the value of the no load speed through the resistors 7 and 8 is also similar.

When the motor 1 is at rest, the auxiliary constant current supplied by the auxiliary metadyne 6 is divided into two parts, and the main part traverses the field winding 2. When the motor accelerates and the speed increases, the electromotive force induced by the auxiliary dynamo 3 increases and it is arranged to have the reverse direction to the current traversing the said auxiliary dynamo while at rest. Therefore, with increasing speed the current in the field winding 2 decreases and becomes nil at the no load speed $N_o$.

In order to amplify the action of the auxiliary dynamo 3 in the neighborhood of the no load speed $N_o$ a shunt winding may be provided across the brushes of the small auxiliary dynamo 3. Fig. 4 illustrates this arrangement, giving a scheme which is identical to the scheme of Fig. 3, except for the addition of the shunt winding 9 controlled by the resistor 10.

If instead of a dynamo machine for the main motor, a metadyne is used as shown in Fig. 5, then the auxiliary dynamo 3 of the previous scheme may be eliminated.

This arrangement may be employed in any of the previous schemes.

In Fig. 5 the metadyne operates as a main motor. The main constant current enters the main motor 11 through the primary brushes $a'$ $c'$, while, between the secondary brushes $b'$ and $d'$ is induced the E. M. F. varying with the speed. Thus, according to the present invention, the two secondary brushes $b'$ and $d'$ are connected in series relation with the main field winding 2 of the main metadyne motor 11, constituting thus a closed circuit which is fed at its two points 15 and 16 by an auxiliary constant current network supplied by an auxiliary constant current generator, shown in Fig. 5 as the metadyne 6.

For all the controlling means the scheme of Fig. 5 is identical with the scheme of Fig. 4 from which it has been derived by the substitution of the secondary rotor winding 12 of the metadyne motor 11 of Fig. 5 for the auxiliary dynamo 3 of Fig. 4.

The same elements bear the same reference numbers.

As the scheme of Fig. 5 has been derived from the scheme of Fig. 4, so also may be as easily derived a corresponding scheme from the schemes of Figs. 1, 2, and 3, eliminating the auxiliary small dynamo 3 and replacing the main dynamo machine 1 by a metadyne motor 11.

So far, for the sake of simplicity, I have represented only one main motor, but it is easy to understand that many main motors may be connected in series relation and inserted in the main constant current circuit while the closed circuit constituted by the excitation winding and the auxiliary source of E. M. F., varying with the speed and belonging to each motor, will be inserted in the same auxiliary circuit fed by the metadyne 6.

It is also to be understood that for generating the auxiliary constant current, any appropriate constant current generator may be used although a metadyne 6 is represented in all the figures, a metadyne being shown because it is the most adequate machine for this purpose.

Many modifications of the windings of the machines here above described, or other alterations may be conceived by those versed in the art, yet remaining within the scope of the present invention.

I claim as my invention:

1. A motor control comprising a direct current motor having a field winding and an armature supplied with constant current and adapted to operate at a practically constant speed showing slight discrepancies from the no load speed even when the torque varies from full accelerating torque to full braking torque, a first auxiliary source of E. M. F. varying with the speed of the motor and connected to the said field winding to form a closed circuit, a second auxiliary source of constant current connected to the said closed circuit at two points for supplying to the field winding of the motor a current automatically varying with the variation of the E. M. F. of the first auxiliary source and means for controlling the E. M. F. developed by the first auxiliary source and so controlling the no load speed value of the motor.

2. A motor control comprising a direct current motor having a field winding and an armature supplied with constant current and adapted to operate at a practically constant speed showing slight discrepancies from the no load speed even when the torque varies from full accelerating torque to full braking torque, a small dynamo machine driven by the motor and connected to the said field winding to form a closed circuit, a metadyne machine connected to the said closed circuit for supplying to the field winding of the motor a current automatically varying with the variation of the E. M. F. of the said small dynamo and means for controlling the E. M. F. of the said small dynamo and so controlling the no load speed value of the motor.

3. A motor control comprising a direct current motor having a field winding and an armature supplied with constant current and adapted to operate at a practically constant speed showing slight discrepancies from the no load speed even when the torque varies from full accelerating torque to full braking torque, a small dynamo machine driven by the motor, a field winding for said dynamo machine, said motor field winding, small dynamo machine and dynamo field winding being connected to form a closed circuit, a metadyne machine connected to the said closed circuit for supplying to the motor field winding a current automatically varying with the variation of the E. M. F. of said small dynamo, and a resistor means in said closed circuit for controlling the E. M. F. of the said small dynamo and so controlling the no load speed of the motor.

4. A motor control as claimed in claim 3, wherein the resistor means comprises a variable resistor connected in series in said closed circuit and a variable resistor shunting said dynamo field winding.

5. A motor control comprising a direct current motor having a field winding and an armature supplied with constant current and adapted to operate at a practically constant speed showing slight discrepancies from the no load speed even when the torque varies from full accelerating torque to full braking torque, a small dynamo machine, driven by the motor, a field winding for said dynamo machine, said motor field winding, small dynamo machine and dynamo field winding being connected to form a closed circuit, a metadyne machine connected to said closed circuit for supplying to the motor field winding a current automatically varying with the variation of the E. M. F. of said small dynamo, means for controlling the E. M. F. of said dynamo comprising a variable resistor connected in series in said closed circuit and a variable resistor shunting said dynamo field winding, and a shunt field winding for the dynamo and resistor for controlling said shunt field winding.

6. A motor control comprising a main metadyne supplied with a constant current through the primary brushes, a main field winding connected to the secondary brushes forming a closed circuit, a constant current generator connected to the said closed circuit at two points for supplying to the said main field winding a current automatically varying with the variation of the E. M. F. induced between the secondary brushes of said main metadyne and means for controlling said E. M. F. and so controlling the no load speed value of the main metadyne.

JOSEPH MAXIMUS PESTARINI.